United States Patent [19]

Stanek

[11] Patent Number: 5,936,554

[45] Date of Patent: Aug. 10, 1999

[54] COMPUTER INPUT DEVICE WITH INTERACTIVELY ILLUMINATING KEYS

[75] Inventor: James B. Stanek, Dakota Dunes, S. Dak.

[73] Assignee: Gateway 2000, Inc., North Sioux City, S. Dak.

[21] Appl. No.: 08/690,855

[22] Filed: Aug. 1, 1996

[51] Int. Cl.⁶ ........................................... G09G 3/00
[52] U.S. Cl. ................ 341/22; 364/709.14; 364/709.15; 341/26; 200/5 A
[58] Field of Search .................. 341/22, 23, 20, 341/26; 340/825.79; 345/173, 174, 175, 159; 200/5 A; 84/478; 364/709.14, 709.15

[56] References Cited

U.S. PATENT DOCUMENTS

| | | | |
|---|---|---|---|
| 3,777,222 | 12/1973 | Harris | 341/26 |
| 3,971,013 | 7/1976 | Challoner | 345/174 |
| 4,567,480 | 1/1986 | Blanchard | 345/175 |
| 4,772,769 | 9/1988 | Shumate | 200/314 |
| 4,908,612 | 3/1990 | Bromley | 345/159 |
| 5,107,743 | 4/1992 | Decker | 84/478 |
| 5,181,029 | 1/1993 | Kim | 341/23 |
| 5,452,960 | 9/1995 | Kuhlenschmidt | 400/487 |
| 5,515,045 | 5/1996 | Tak | 341/22 |
| 5,557,055 | 9/1996 | Beitweiser | 84/478 |
| 5,748,177 | 5/1998 | Baker | 345/133 |
| 5,801,345 | 9/1998 | Mikula-Curtis | 200/5 A |
| 5,818,361 | 10/1998 | Acevedo | 341/23 |

OTHER PUBLICATIONS

"Compaq and Fisher–Price Redefine Children's Computing with New Line of Interactive Products", *Business Wire*, 4 pages, (Jan. 5, 1996).

"Family–oriented PC products take on new dimension", *Discount Store News*, vol. 34, No. 18, 3 pages, (Sep. 18, 1995).

"Kidboard Keyboard", http://www.kidboard.com/features.html, Kidboard Keyboard Product Information, 3 pages, (Apr. 3, 1996).

"Kidtech announces 'My first keyboard'™ The computer keyboard designed just for kids!", *PR Newswire*, p. 0106FL008, 2 pages, (Jan. 6, 1996); (undated product brochure attached, 2 pgs).

K. Bryant, "Integrated language arts package makes a connection with kindergartners", *Technological Horizons in Education Journal*, vol. 20, No. 4, 6 pages, (Nov. 1992).

J. Donelan, "Computing for little kids", *PC Magazine*, vol. 15, No. 1, p. 384, 2 pages, (Jan. 9, 1996);(undated product brochure attached, 2 pages).

Gus Silber, "Pleez, Sarah Jane, may I have my Pentium back?", http://www.mg.co.za/mg/pc/oct–sarahjane.html, 5 pages, (Apr. 9, 1996).

*Primary Examiner*—Michael Horabik
*Assistant Examiner*—Albert K. Wong
*Attorney, Agent, or Firm*—Schwegman, Lundberg Woessner & Kluth P.A. & Anthony Claborne

[57] ABSTRACT

An interactively illuminating computer input device for a computer is disclosed. In one embodiment the device is a keyboard. The keyboard has a bi-directional communication link between the keyboard and the computer. The keyboard also has one or more keys, each capable of illumination. The keyboard also has a keyboard controller, operably coupled to the bi-directional communication link and the keys. The keyboard controller detects depression of a key on the keyboard by the user of the computer. The keyboard controller also controls the illumination of a key on the keyboard by the computer. In one embodiment, the keyboard controller receives from the computer a unique command for each key to illuminate the key. In a further embodiment, the keyboard controller receives from the computer a unique command for each key to dim the key. In yet a further embodiment, the keyboard controller receives from the computer a unique command for each key to illuminate the key if the key is dim, and to dim the key if the key is illuminated.

15 Claims, 4 Drawing Sheets

COMPUTER INPUT DEVICE WITH INTERACTIVELY ILLUMINATING KEYS

FIELD OF THE INVENTION

This invention relates generally to an input device for a computer, and more particularly to such a device having interactively illuminating keys.

BACKGROUND OF THE INVENTION

In the past few years, computers have been used to run applications unheard of twenty years ago, or even ten years ago. Historically, computers were expensive and therefore only affordable to large corporations. These corporations usually utilized computers in various data processing applications. Typically, the employees responsible for running the computers had considerable expertise. When interacting with a computer via an input device such as a keyboard, for example, these individuals were sufficiently skilled such that they knew which keys on the keyboard they had to press at any particular time. Furthermore, the computer user typically interacted with the computer minimally at most. The user would enter in data prior to a particular "job" or task being run by the computer, and then would view the results on a monochrome screen.

Today, however, computers are used by people from all walks of life, who frequently have little or no training in running the computers. Personal computers, such as those sold by companies such as Gateway 2000, have become relatively affordable to the average consumer. People buying such computers usually need a level of hand-holding unnecessary by computer users of a generation ago. Today's users do not always know which key to press on the keyboard at any particular time. In addition, today's computers include software applications that are much more interactive than past applications. No longer does a user enter information and then sit back and watch the computer process the data. Rather, the user typically interacts with the computer at each step along the way, viewing results on a display capable of showing thousands if not millions of different colors at any one time.

For example, today many popular software applications for computers are educational programs for children. Such programs usually allow the computer user, typically a child, to press a key on the keyboard. In response, the programs present a multimedia display to the child corresponding to that key. For example, pressing the letter 'G' on the keyboard may show a multimedia presentation of an animal whose name begins with this letter—a giraffe, etc. This sort of interactive computer program was nearly nonexistent twenty years ago. However, the rapid increase in computer technology, along with the rapid decrease in price of that technology, has made these sorts of applications possible, and indeed, commonplace.

Nevertheless, even with this paradigm shift in computer technology and utilization, the primary input device for computers, the computer keyboard, has changed remarkably little. The computer keyboard has its historical roots in the typewriter keyboard, which has its keys organized in a particular layout commonly known as "QWERTY." As it is used in computer applications, the "QWERTY" keyboard acquired some other common characteristics, including a set of function keys located above the primary set of alphabetical and numerical keys, a set of numeric keys organized in what is commonly known as a ten-key arrangement, and frequently a set of cursor keys and other control keys (for such control commands as page up, page down, etc.). This basic layout has survived the rapid transition of the computer as a tool for business to be used by only skilled technicians to an appliance for the home to be used by average consumers not having any computer skills.

In recognition that the computer keyboard does not well serve today's computer users, several prior art have attempted to make a more user-friendly keyboard, at least for certain applications. Most prevalent has been a child-oriented keyboard. Such a keyboard typically has color-coded keys, so that unsophisticated computer users, such as children, can more easily discern, for example, numeric keys from alphabetic keys. Other prior art keyboards include keys which are oversized, or are interactive in that a particular multimedia presentation on the monitor of the computer is played when certain keys of the keyboard are pressed. However, although these sorts of keyboards may make the keyboard appear more inviting (e.g., through use of color-coded or oversized keys), or are interactive in that the computer immediately responds to the pressing of keys on the keyboard, they do not actually guide the user as to which key to press next.

This deficiency in computer keyboard technology is significant. Although a keyboard with oversized or color-coded keys may make the computer more inviting to a user, it does not appreciably assist the user as to which keys to press on the keyboard. Furthermore, an interactive keyboard in which specific multimedia presentations are tied to specific keys on the keyboard communicates with the computer in one direction only: the computer responds to the keyboard, but not vice-versa. There is a need, therefore, for a keyboard which is truly interactive, in that it guides the user as to which key to press next, or which of a group of keys can be pressed by the user.

SUMMARY OF THE INVENTION

This inventions relates to a computer input device having interactively illuminating keys. In one embodiment of the invention, the device is a computer keyboard. In another embodiment of the invention, a keyboard comprises an interface for attaching the keyboard to a computer, a bi-directional communication link between the keyboard and the computer, and a plurality of illuminating keys. Each illuminating key is individually receptive to a first command received from the computer through the communication link, such that upon receipt the key is illuminated. In a further embodiment of the invention, each key is also receptive to a second command such that upon receipt the key is dimmed.

In this manner, the present invention allows for the advantage of guidance to a user of the computer as to which key or keys on the keyboard to select next. If in response to a program running on the computer the user is only allowed to depress the enter key, for example, then the computer can send a signal to the keyboard to illuminate the enter key. Upon depression of the enter key, the computer can then signal to the keyboard to subsequently dim the enter key. In this way, the user of the computer is informed via the keyboard as to what key to press next.

In another embodiment of the invention, a computerized system of interaction between a computer and a user of the computer includes an interactive illuminating keyboard, a bi-directional communication link, and a keyboard controller. The keyboard is coupled to the computer and has a plurality of illuminating keys. Each key is individually receptive to a command received from the computer to illuminate the key. In another embodiment of the invention, each key is also receptive to a command to dim the key. The communication link allows the keyboard to communicate with the computer. The keyboard controller detects depression of a key on the keyboard by the user of the computer, and also controls illumination of a key on the keyboard.

In another embodiment of the invention, each key includes a key cap. Underneath the cap a light-emitting diode (LED) is affixed. Upon receipt of the proper command sent by the computer, the diode is illuminated. In a further embodiment of the invention, upon receipt of another command sent by the computer, the diode is dimmed.

In another embodiment of the invention, a computer has software run thereon to control a keyboard having interactively illuminating keys. In one embodiment, such software includes means to illuminate a particular key to guide the user of the computer as to which key to depress. In another embodiment, the software includes means to subsequently dim the particular key upon its depression by the user.

In yet another embodiment of the present invention, the computer displays on a monitor attached to the computer a multimedia presentation associated with a particular key when that key is pressed. In still another embodiment of the invention, the computer thereon illuminates the keys active for a particular game running on the computer, and dims the other keys which are inactive for that game. In another embodiment of the invention, the computer runs a typing tutor program, illuminating keys in conjunction with the program. Still other and further aspects and advantages of the present invention will become apparent in the following description and by reference to the accompanying drawings.

BRIEF DESCRIPTION OF THE DRAWINGS

FIG. 2(*b*) is a bottom view of the keycap of FIG. 2(*a*);

DETAILED DESCRIPTION OF THE DRAWINGS

Figure 1:
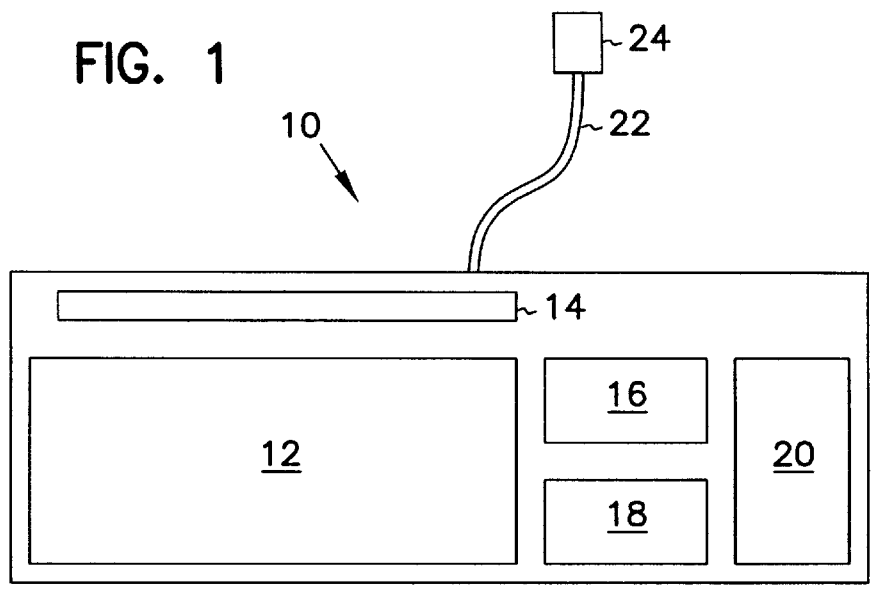
FIG. 1 is a diagram of a typical interactive illuminating keyboard according to the present invention.

The present invention provides for a computer input device having interactively illuminating keys. The present invention is not limited as to the type of input device on which it is applied. However, a typical example of such a device, a computer keyboard having a plurality of keys, is shown in FIG. 1. Another input device amenable to the present invention is a mouse having one or more buttons, the buttons corresponding to the keys of the keyboard referenced herein. Keyboard 10 of FIG. 1 includes alphanumeric keys 12. Alphanumeric keys typically 12 includes keys for each letter of the alphabet, keys for each of the numerals 0–9, and other keys, such as back space, space bar, enter, tab, etc. Alphanumeric keys 12 are typically organized in what is known to those of ordinary skill in the art as a QWERTY layout; however, they may be organized in any fashion without departing from the spirit or scope of the present invention. For example, they may also be organized in what is known as a DVORAK layout.

As shown in FIG. 1, keyboard 10 also includes function keys 14. Typically, function keys 14 includes ten or twelve function keys, each usually labeled with an "f" followed by the number of the particular key—for example, f1, f2, etc. However, the invention is not so limited to an embodiment thereof having a particular number of function keys.

Furthermore, as shown in FIG. 1, keyboard 10 also includes numeric keys 20, cursor keys 18 and command keys 16. Numeric keys 20 are numerical keys and mathematical operator keys typically organized in what is known to those skilled in the art as a ten-key layout. Again, however, the invention is not so limited. Cursor keys 18 typically include keys for controlling the cursor on a screen of a monitor attached to the computer to which the keyboard is also attached. These keys are usually organized in what is known as an inverted T fashion, although the present invention is not so limited. Finally, command keys 16 typically include keys for particular commands such as insert, delete, page up, page down, etc. There are usually six of these keys, but the present invention is not so limited.

Those skilled in the art will appreciate that the described alphanumeric keys 12, function keys 14, command keys 16, cursor keys 18 and numeric keys 20, effect just one embodiment of the present invention. The present invention in fact can be applied to any keyboard without departing from the scope and spirit thereof. For example, in a particular embodiment of the invention a keyboard may not include function keys 14, or numeric keys 20. Furthermore, alphanumeric keys 12 may correspond to letters of a language other than English; for example, Japanese, German or French. In addition, keys 12, 14, 16 and 18 may include other keys or omit keys as herein described without departing from the spirit or scope of the present invention. For example, in one embodiment of the invention, alphanumeric keys 12 may include keys other than typical alphabetical or numerical keys, such as a control key or an ALT key.

As shown in FIG. 1, keyboard 10 also includes cable 22 ending in jack 24. Cable 22 and jack 24 allow keyboard 10 to plug into a computer, so that the computer and the keyboard can interact. In one embodiment of the invention, jack 24 is a serial nine-pin connector plugging into a serial port on the back of the computer. The present invention, however, is not limited to any particular manner in which the keyboard interacts with the computer. For example, rather than a cable ending in a jack as shown in FIG. 1, in one embodiment of the invention the keyboard includes a keyboard having a wireless communication link with the computer, such as infrared or radio frequency communication. That is, any particular communications link can be used.

However, the communications link must allow for bi-directional communications between the keyboard and the computer. This is because the computer must signal to the keyboard which keys to illuminate, while the keyboard must signal to the computer which keys have been depressed. In one embodiment of the present invention, the computer to which the keyboard is connected has implemented therein what is known to those of ordinary skill in the art as a Universal Serial Bus (USB). The USB allows for bi-directional communications.

Not shown in FIG. 1 is that the keyboard usually also includes a keyboard controller that detects depression of the individual keys on the keyboard. The keyboard controller constantly scans circuits leading to the key caps of individual keys within the keyboard. It detects the increase or decrease in current from the key that has been pressed. By detecting either an increase or a decrease in current, the controller can tell both when a key has been pressed and when it has been released. Thus, when a user presses a key on the keyboard, the keyboard controller detects this and sends an appropriate signal to the computer to which the keyboard is connected via the communications link (i.e., a cable ending in a jack, a wireless transmitter, etc.).

The keyboard controller also controls the illumination of the individual keys of the keyboard. The keyboard controller receives a command from the computer as to whether a particular key should be illuminated. It then illuminates that key. Further, in another embodiment of the invention, the keyboard controller receives a command from the computer as to whether a particular key that is illuminated should be dimmed—that is, that the illumination of that particular key should be turned off. It then dims that key (i.e., turns off the illumination of that key). In another embodiment of the invention, the keyboard controller receives a command from the computer that toggles the illumination of a key; that is, the key is dimmed by the controller if it is currently illuminated, and vice-versa. The keyboard controller in one embodiment is an integrated circuit within the keyboard. The invention is not limited as to the type of integrated circuit. In one embodiment of the invention, however, the integrated circuit used is what is known to those of ordinary skill within the art as the 80C51BHP.

Alternatively, the controller according to the present invention varies other aspects of the illumination of a particular key in response to receiving a command from the computer. For example, the key may have the capability of being illuminated in one of many different colors, which is common in the case where the illuminating element of the key is a light-emmitting-diode (LED) capable of more than one color. For further example, the intensity of the illumination of the key may be controlled. That is, the illumination of the key may be bright, turned off, at medium intensity level, etc. For yet further example, the frequency of the illumination of the key may be controlled. That is, the illumination of the key may have the capability of blinking at a rate that can be adjusted, which is also common in the case where the illuminating element is a certain type of LED. The present invention is not limited to any particular manner in which the illumination of a key is controlled.

Still referring to FIG. 1, at least one of the keys of keys 12, 14, 16, 18 and 20 is illuminating. In one embodiment of the invention, there are also keys that cannot be illuminated, whereas in another embodiment of the invention, all the keys are capable of illumination. The present invention is not limited to any particular number of keys being capable of illumination. Furthermore, the present invention is not limited as to the keys being illuminated in a particular manner.

However, in one embodiment, each illuminated key is illuminated as is now described in conjunction with FIGS. 2–7. The top view of an individual key is shown in FIG. 2(a) as keycap 26. As shown in FIG. 2(a), keycap 26 corresponds to the letter "m". The bottom view of the individual key is shown in FIG. 2(b). As shown, keycap 26 has connector slot 28 through its vertical axis, which connects to the sides of keycap 26 via lateral supports 30, 32, 34 and 36. Thus, as shown in FIG. 2(b), there are four cavities in keycap 26, defined by the intersections of the sides of the keycap, the lateral supports, and the connector slot. Further, connector slot 28 is shaped in a cross pattern. Keycap 26, connector slot 28, and lateral supports 30, 32, 34 and 36 are in one embodiment made of hard and durable plastic, although the invention is not so limited.

Figure 2A:
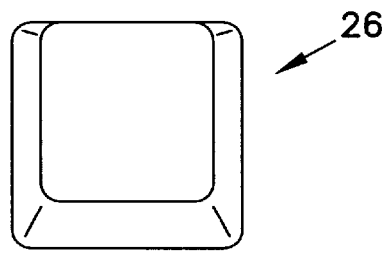
FIG. 2(*a*) is a top view of a typical keycap of a key of an interactive illuminating keyboard under the present invention.
Figure 2B:
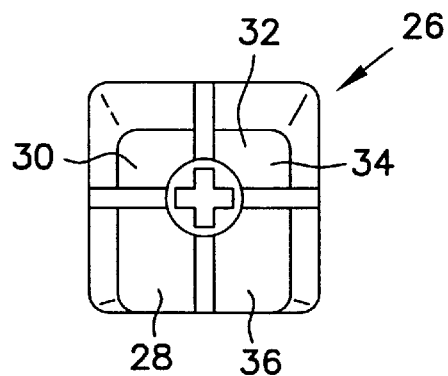
Figure 3:
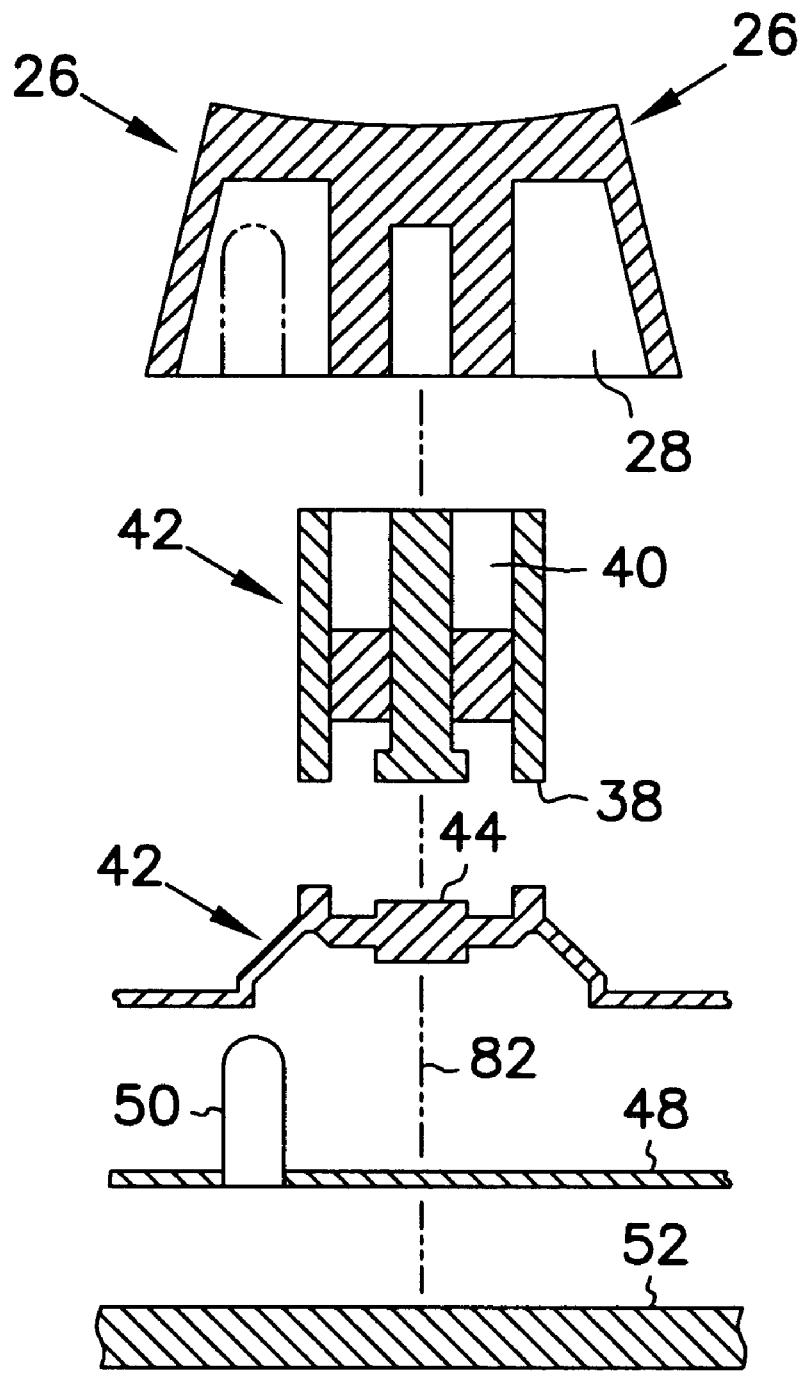
FIG. 3 is an exploding sectional view of a typical illumination-capable key of an interactive illuminating keyboard under the present invention.
Figure 4:
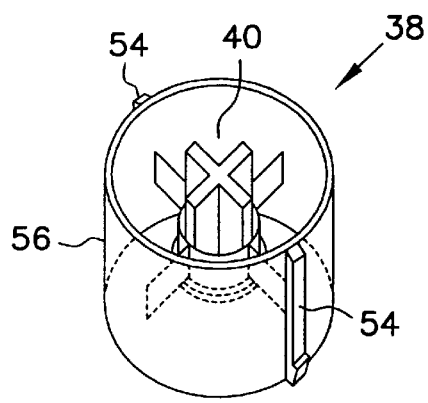
FIG. 4 is an isometric view of a plunger of the key of FIG. 3.

An exploding sectional view of an illuminating key of the keyboard according to one embodiment of the present invention is shown in FIG. 3. Keycap 26 with connector slot 28, identical to the keycap with connector slot shown in and described in conjunction with FIG. 2(a) and FIG. 2(b), fits over and is affixed to plunger 38 with connector tab 40. Plunger 38, with connector tab 40, is in one embodiment also made of hard and durable plastic, although the invention is not so limited. An isometric view of plunger 38 is shown in FIG. 4. As shown in FIG. 4, plunger 38's connector tab 40 is shaped in a cross pattern, in order to match connector slot 28 of keycap 26, to which it affixes. Plunger 38 also has tabs (or guides) 54 and 56 running vertically down the plunger's sides, at 180 degrees from one another.

Figure 5:
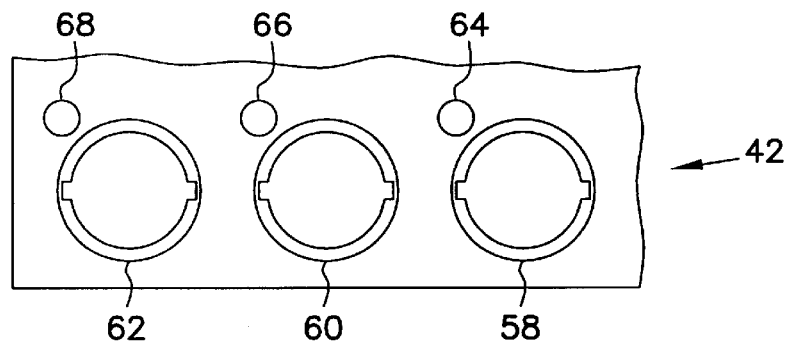
FIG. 5 is a top view of a typical frame of an interactive illuminating keyboard under the present invention.

Referring back to FIG. 3, plunger 38 closely fits in a cavity of frame 42, such that plunger 38, with keycap 26 attached thereto, has freedom of vertical movement within the cavity of frame 42. Frame 42 is preferably made of hard and durable plastic, although the invention is not so limited. Further, in one embodiment the frame is sufficiently large and has sufficient cavities to accommodate the plungers of all the keys of the keyboard. A top view of the frame is shown in FIG. 5, wherein frame 42 has cavities 58, 60 and 62 to accommodate the plungers of keys. Note that as shown in FIG. 5, cavities 58, 60 and 62 are shaped such that they accommodate the tabs or guides of the plunger (e.g., tabs or guides 54 and 56 as shown in FIG. 4). These cavities are in one embodiment at 90 degrees from one another. As shown in FIG. 5, frame 42 also has LED cavities 64, 66 and 68.

Figure 6:
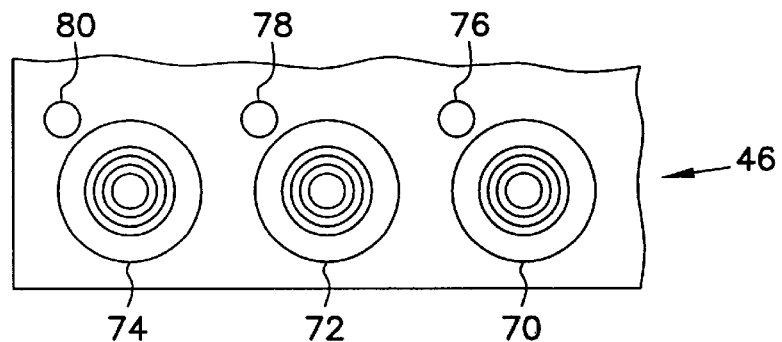
FIG. 6 is a top view of a flexible sheet having a plurality of domes of an interactive illuminating keyboard under the present invention.

Referring back to FIG. 3, when keycap 26 is depressed, plunger 38 moves within the cavity of frame 42, and presses against dome 44 of flexible sheet 46. Flexible sheet 46 is in one embodiment made of rubber, although the invention is not so limited. Further, in one embodiment the flexible sheet is sufficiently large and has sufficient domes to accommodate the plungers of all the keys of the keyboard. A top view of the flexible sheet is shown in FIG. 6, wherein flexible sheet 46 has domes 70, 72 and 74, which line up with and correspond to cavities 58, 60 and 62 of FIG. 5. Also as shown in FIG. 6, sheet 46 has LED cavities 76, 78 and 80, which line up with and correspond to LED cavities 64, 66 and 68 of FIG. 5.

Referring back to FIG. 3, as keycap 26 is depressed, plunger 38 moves within the cavity of frame 42, pressing against dome 44 of flexible sheet 46 such that conductive pad 82 of dome 44 presses against a normally open circuit on circuit board 48, and closes the circuit. The keyboard controller is thus signaled that this particular key has been depressed. Circuit board 48 is affixed to base 52, to provide rigidity, since circuit board 48 is typically flexible. Conductive pad 82 is affixed to the bottom of dome 44, and can be made of any material that is capable of conducting electrical current. Also shown in FIG. 3 is light-emitting diode (LED) 50 affixed to circuit board 48. As shown, LED 50 fits through cavities in frame 42 and flexible sheet 46 (e.g., cavities such as LED cavity 64 of FIG. 5 and LED cavity 76 of FIG. 6), and fits under keycap 26. The top surface of keycap 26 is translucent, to allow LED 50 to illuminate through. When signaled by the computer, the keyboard controller of the keyboard correspondingly turns on or off the LED.

Figure 7:
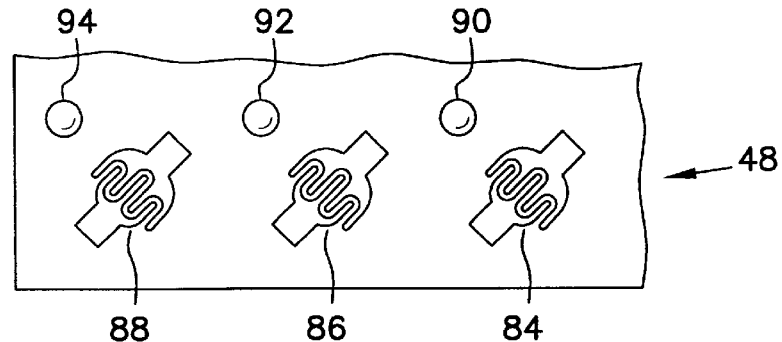
FIG. 7 is a top view of a printed circuit board of an interactive illuminating keyboard under the present invention; and, FIG. 8 is a diagram of a typical computer system having a computer and an interactive illuminating keyboard under the present invention.

A top view of circuit board 48 is shown in FIG. 7. Circuit board 48, corresponding to circuit board 48 of FIG. 3, includes open circuits 84, 86 and 88, each corresponding to a separate key. When a key is depressed, the conductive pad of a dome presses against an open circuit, closing the circuit and signaling to the keyboard controller that the key has been pressed. Circuit board 48 also includes light-emitting diodes (LEDs) 90, 92 and 94. These diodes are affixed to circuit board 48 via two leads. Note that as shown in FIG. 7 there is one LED per key. However, the lateral supports of a keycap are positioned such that there are four cavities underneath the keycap, as shown in FIG. 2(b). Thus, there is potentially one LED per cavity; furthermore, there are potentially multiple illuminating elements per cavity. The invention is, therefore, not so limited to one LED or illuminating element per key.

Figure 8:
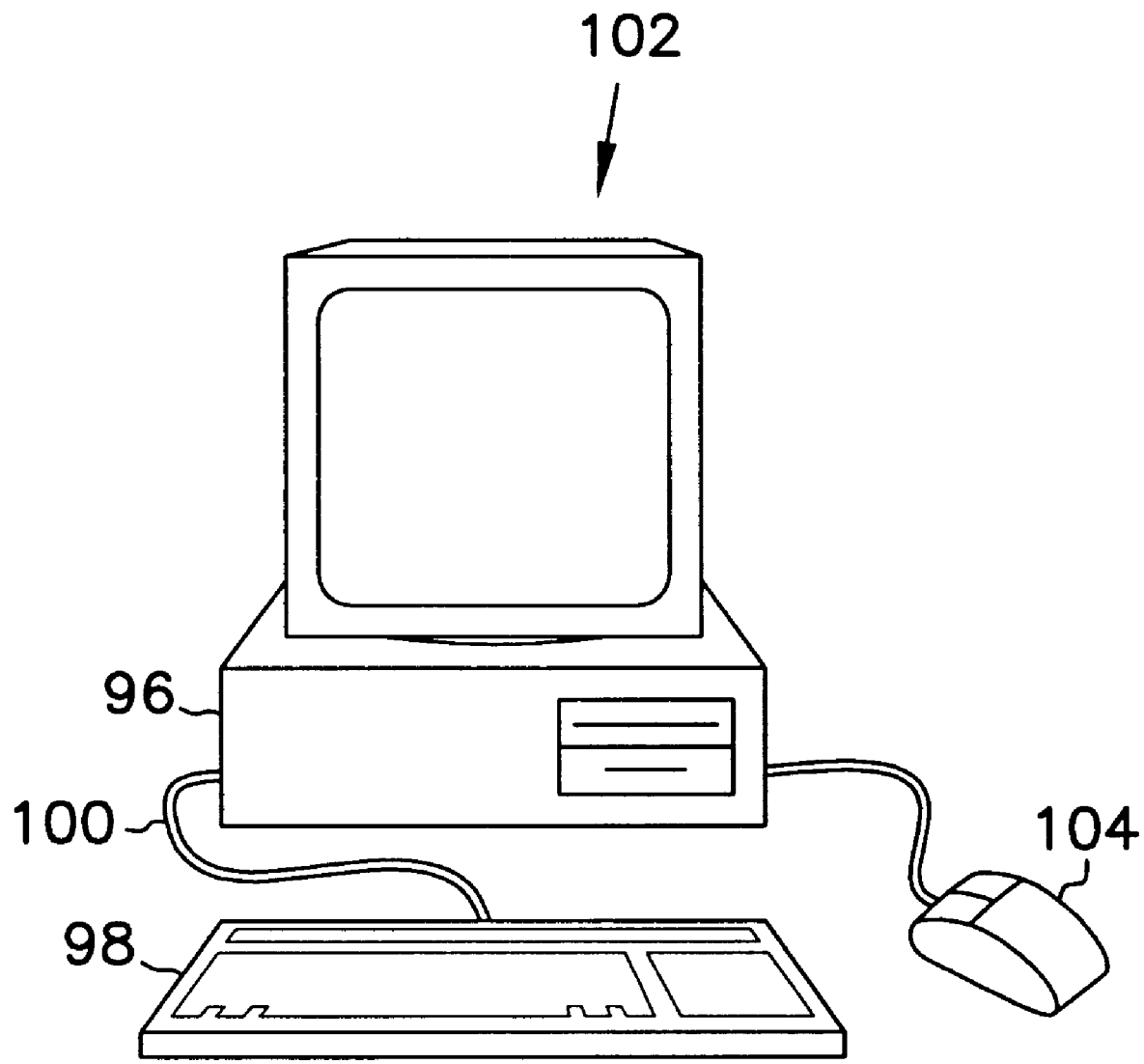

Referring now to FIG. 8, a computer system according to the present invention is shown. Computer 96 is a computer, and may be of any type, such as a Gateway 2000, etc. Computer 96 has coupled thereto illuminating keyboard 98. Illuminating keyboard 98 corresponds to keyboard 10 of FIG. 1, and reference should be made to that figure and its accompanying discussion for further understanding thereto. Illuminating keyboard 98 is coupled to computer 96 via communication link 100. Note that as shown in FIG. 8, communication link 100 is a cable between keyboard 98 and computer 96. However, the invention is not so limited. Communication link 100 in another embodiment is a wireless link, in which each of computer 96 and keyboard 98 have a transceiver for transmitting and receiving signals between each other (i.e., via infrared or radio frequency). Computer 96 is also coupled to display device 102. Display device 102 can be any of a number of different display devices or monitors. Furthermore, computer 96 is coupled to pointing device 104, which as shown in FIG. 8 is a mouse. However, the invention is not so limited. Not shown is that computer 96 typically also comprises a random-access memory (RAM), a read-only memory (ROM), a central-processing unit (CPU) such as an Intel Pentium processor, a fixed storage device such as a hard disk drive, and a removable storage device such as a floppy disk drive.

The computerized system as shown in FIG. 8 in one embodiment illuminates a particular key to guide the user of the computer as to which key to depress. In one embodiment the system guides the user as to which key to depress via a computer program residing in the RAM of the computer and executed by the CPU thereof, although the invention is not so limited. Thus, computer 96 instructs the keyboard controller of keyboard 98 via communications link 100 to illuminate a particular key. For example, in a computer program designed to teach a computer user how to type, the program illuminates the next key on the keyboard that should be depressed by the user. Upon depression of that key by the user, the computer program then dims the key. That is, the keyboard controller of keyboard 98 detects that the key has been pressed, and signals this information to computer 96 via communications link 100; in turn, computer 96 instructs the keyboard controller of keyboard 98 via communications link 100 to dim the key.

The computerized system as shown in FIG. 8 in another embodiment of the invention illuminates a particular key, and upon depression of the particular key by the user of the computer, displays on the monitor attached to the computer a multimedia presentation associated with the particular key. In one embodiment the system accomplishes this via a computer program residing in the RAM of the computer and executed by the CPU thereof, although the invention is not so limited. Thus, computer 96 instructs the keyboard controller of keyboard 98 via communications link 100 to illuminate a particular key. When the keyboard controller detects that the key has been pressed, it signals this information to computer 96. Computer 96, via the program running thereon, then displays on the monitor a multimedia presentation associated with the particular key. For example, if the user presses the 'g' key, the computer may play a multimedia presentation regarding a giraffe. After playing the presentation, the computer then dims the particular key.

The computerized system as shown in FIG. 8 in yet another embodiment of the present invention illuminates only those keys that are active in a particular game (for example, the popular computer game Doom) running on the computer, and dims all the other keys. In one embodiment the system effects this via a computer program residing in the RAM of the computer and executed by the CPU thereof, although again the invention is not so limited. Thus, computer 96 instructs the keyboard controller of keyboard 98 via communications link 100 to illuminate the particular keys used in the game, and dim the other keys. Until game play is over, the computer then does not further instruct the keyboard to illuminate or dim keys; thus, the active keys of the game are continually illuminated, while the inactive keys are continually dim.

The computerized system as shown in FIG. 8 in still yet another embodiment of the present invention illuminates keys in conjunction with a typing tutor program running on the computer. A typing tutor program is a program that helps a user of the computer learn how to type. In one embodiment the system effects this via a computer program residing in the RAM of the computer and executed by the CPU thereof, although the invention is not so limited. Thus, computer 96 instructs the keyboard controller of keyboard 98 via communications link 100 to illuminate the particular key that the user should press next, in conjunction with a program that teaches the user how to type. This helps the user locate the key on the keyboard, and eliminates the user having to search the keyboard for that particular key. Upon the user pressing the key, the program then turns off the illumination thereof, and turns on the illumination of the next key.

As the present invention has been described, the invention allows for a number of advantages. First, it allows for interactive illumination of the keyboard. The computer to which the keyboard is connected can signal the keyboard controller of the keyboard to illuminate a particular key. Upon receiving a signal from the controller that the key has been depressed by the user, the computer can then signal the keyboard to dim that key. In this manner, too, the present invention allows for the guidance of a neophyte computer user. The computer can selectively illuminate only those keys to which a user's attention should be drawn. Thus, the user is not confused by the other, undimmed keys, which are not relevant to the particular application program being run on the computer.

These of ordinary skill in the art will readily appreciate that many changes and modifications to the above drawings and description can be made without departure from the spirit or scope of the following claims. For example, the invention has been shown to utilize a particular manner to illuminate a key of a keyboard—a light emitting diode located underneath a translucent keycap. However, the invention could utilize other manners of key illumination without departing from the scope of the claims. For further example, the invention has been shown to utilize only one diode per key. However, the invention could utilize two or more diodes per key, even of different colors, also without departing from the following claims.

I claim:

1. An interactive illuminated computerized system comprising:

a computer;

an alphanumeric computer keyboard coupled to the computer and comprising a plurality of individually and selectively illuminable keys, each key comprising:

a key cap capable of motion along a vertical axis, having an entirely translucent upper surface with a fixed key legend disposed thereon, and having a lower surface intersected by one or more ribs such that one or more underside cavities are defined; and, a single light-emit diode (LED) positioned directly below one of the underside cavities of the keycap, the LED responsive to a turn-on signal received from the computer and a turn-off signal received from the computer to control illumination of the LED, the LED positioned along an axis coincident with the vertical axis of the motion of the key cap; and, a bi-directional link coupling the computer to the keyboard for sending the turn-on signal and the turn-off signal for each key from the computer.

2. The interactive illuminated computerized system of claim 1, wherein the keyboard receives from the computer a unique command to control the illumination of each key.

3. The interactive illuminated computerized system of claim 1, wherein the keyboard receives from the computer a unique command to control the color of illumination of each key.

4. The interactive illuminated computerized system of claim 1, wherein the keyboard receives from the computer a unique command to control the frequency of illumination of each key.

5. The interactive illuminated computerized system of claim 1, wherein the keyboard receives from the computer a unique command to control the intensity of illumination of each key.

6. The interactive illuminated computerized system of claim 1, wherein the keyboard includes some keys that are not individually and selectively illuminable.

7. The interactive illuminated computerized system of claim 1, wherein the keyboard includes an alphabetic group of keys organized in a QWERTY layout.

8. The interactive illuminated computerized system of claim 1, wherein the keyboard includes a numeric group of keys organized in a ten-key layout.

9. The interactive illuminated computerized system of claim 1, wherein the keyboard includes a group of function keys and a group of cursor control keys.

10. The interactive illuminated computerized system of claim 1, wherein the bi-directional communication link is a cable attached to the keyboard on one side and attached to the computer on the other side.

11. The interactive illuminated computerized system of claim 1, wherein the bi-directional communication link is a wireless link such that of the computer and the keyboard has a transceiver capable of wireless transmission of signals.

12. The interactive illuminated computerized system of claim 1, further comprising guidance means, residing within the RAM and executed by the CPU, for changing the illumination of a particular key to guide a user of the computer as to the operation of the computer.

13. The interactive illuminated computerized system of claim 1, further comprising interactive learning means for illuminating a particular key and upon depression of the particular key by a user, displaying on a monitor attached to the computer, a multimedia presentation associated with the particular key.

14. The interactive illuminated computerized system of claim 1, further comprising game mapping means for illuminating the particular keys that are active in a particular game and dimming the other keys while a user of the computer is playing the particular game.

15. The interactive illuminated computerized system of claim 1, further comprising typing tutor means for changing the illumination of the keys in conjunction with teaching a user of the computer how to type on the keyboard.

\* \* \* \* \*